United States Patent

Toole

[15] 3,638,002

[45] Jan. 25, 1972

[54] HIGH-SPEED DIRECT BINARY-TO-BINARY CODED DECIMAL CONVERTER

[72] Inventor: Pierce C. Toole, Cocoa, Fla.

[73] Assignee: The United States of America as represented by the Administrator of the National Aeronautics and Space Administration

[22] Filed: Apr. 3, 1970

[21] Appl. No.: 25,487

[52] U.S. Cl. ....................................235/155, 340/347 DD

[51] Int. Cl. ....................................H04l 3/00

[58] Field of Search....................................235/155

[56] References Cited

UNITED STATES PATENTS 3,526,759 9/1970 Clapper ....................................235/155
3,257,547 6/1966 Bernstein....................................235/155

*Primary Examiner*—Daryl W. Cook
*Assistant Examiner*—Jeremiah Glassman
*Attorney*—James O. Harrell and G. T. McCoy

[57] ABSTRACT

A high-speed binary-to-binary coded decimal converter which includes a plurality of decades connected in cascade. Interposed between each of said decades is a carry circuit. The carry circuit supplies carry numbers to the succeeding decade, plus it sends a corrector number back to a corrector circuit associated with the preceding decade. This corrector number is combined with binary numbers already stored in the corrector circuit to produce a proper signal on a readout device associated therewith.

8 Claims, 6 Drawing Figures

Figures 1, 2, 3:
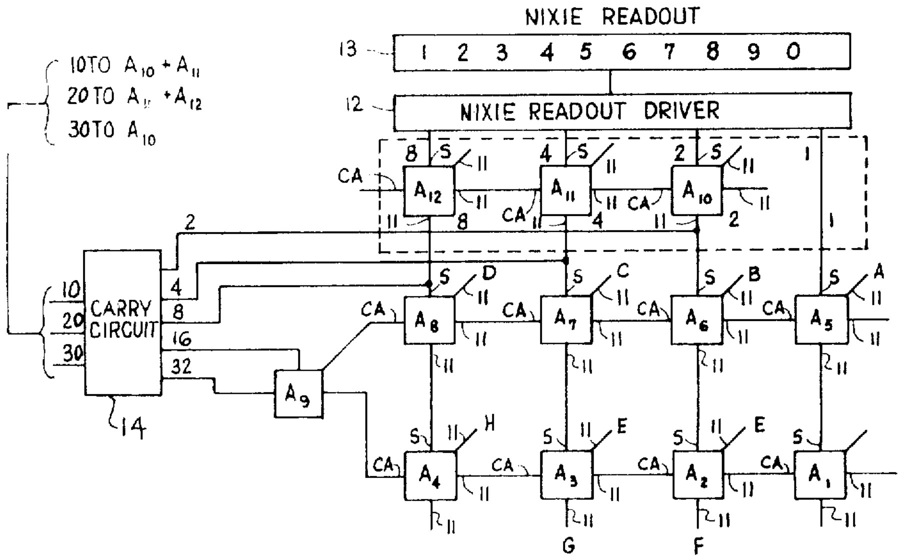
PRIOR ART Fig. 1.

| | TENS | | | | UNITS | | | | |
|---|---|---|---|---|---|---|---|---|---|
| | 8 | 4 | 2 | 1 | 8 | 4 | 2 | 1 | MSB LSB |
| (1) | | | | | | | | | 1 1 1 1 1 = 31 |
| (2) | | | | | | | 1 | 1 | 1 1 1 3 shifts & test |
| (3) | | | | | | 1 | 1 | 1 | 1 1 add 3 |
| (4) | | | | | 1 | 0 | 1 | 0 | 1 1 shift & test |
| (5) | | | | 1 | 0 | 1 | 0 | 1 | 1 add 3 |
| (6) | | | | 1 | 1 | 0 | 0 | 0 | 1 shift only |
| (7) | | | 1 | 1 | 0 | 0 | 0 | 1 | |

30 + 1 = 31

PRIOR ART

| | TENS | | | | UNITS | | | | MSB LSB |
|---|---|---|---|---|---|---|---|---|---|
| | 8 | 4 | 2 | 1 | 8 | 4 | 2 | 1 | |
| (1) | | | | | | | | | 1 1 1 1 1 = 31 |
| (2) | | | | | | | 1 | 1 | 1 1 1 3 shifts & test |
| (3) | | | | | | 1 | 1 | 1 | 1 1 add 3 |
| (4) | | | | | 1 | 0 | 1 | 0 | 1 1 shift & test |
| (5) | | | | 1 | 0 | 1 | 0 | 1 | 1 add 3 |
| (6) | | | | 1 | 1 | 0 | 0 | 0 | 1 shift only |
| (7) | | | 1 | 1 | 0 | 0 | 0 | 1 | |

30 + 1 = 31

| | | | | |
|---|---|---|---|---|
| H | 1 | 2 | 8 | 10000000 |
| G | | 6 | 4 | 01000000 |
| F | | 3 | 2 | 00100000 |
| E | | 1 | 6 | 00010000 |
| D | | | 8 | 00001000 |
| C | | | 4 | 00000100 |
| B | | | 2 | 00000010 |
| A | | | 1 | 00000001 |
| | | 3 | 5 | |

INVENTOR.
PIERCE C. TOOLE
BY
James O. Harrell
ATTORNEYS

INVENTOR.
PIERCE C. TOOLE
BY
James O. Harrell
ATTORNEYS

INVENTOR.
PIERCE C. TOOLE
BY
James O. Harrell
ATTORNEYS

HIGH-SPEED DIRECT BINARY-TO-BINARY CODED DECIMAL CONVERTER

The invention described herein was made by an employee of the United States Government, and may be manufactured and used by or for the Government for Governmental purposes without the payment of any royalties thereon or therefor.

This invention relates to a converter, and more particularly to a converter which converts a binary number directly to a binary coded decimal number without the use of counters and clocks.

Binary numbers use only two characters to write any number. The characters are a "0" and a "1." The magnitude is established by the position of the decimal point in the number. In a computer decisions can be made to recognize a given voltage level as a logic "1" and some other level as a logic "0." Moving the decimal point one place to the right will multiply the number by two. Moving it two places will multiply the number by 4, etc. Each single shift in the decimal point one place will multiply the number by two again. To move the decimal point to the left will divide the number by two for each single change in position of the decimal point.

Most computers must move the decimal point to either the extreme left or right prior to any operation on the number and keep track of how many places it was moved n which direction. Most computers also trade off machine time to reconstruct numbers so that the display or printout can be made in standard 10 number systems, sometimes with an exponent to the number.

Digital telemetry systems (pulse code modulated) presently being used in monitoring and checking out the operation of space vehicles send the information, as a general rule, in binary form in a steady stream of binary bits in sequence repeating the format. Each quantity of information has a given number of binary bits and is presented in a readout device for a fixed time. The information must be presented to the printer, or other display devices in a number system that can be recognized (base 10) in this fixed time. Therefore, it is obvious that the binary information must be converted in order to be recognized subsequently by the operators.

A system exists that can convert a straight binary whole number to what is referred to as a "binary coded decimal." A number that has a fractional part is not capable of being handled by the existing system. This system requires a clock and counterchain to shift the number through a fixed routine sampling the number and adding in 3 to the number under certain conditions. This is referred to as the excess three coded binary-to-binary coded decimal conversion system. The time to convert a binary number to binary coded decimal is fixed and is always the same for any number. If any bit is changed the whole conversion process must be repeated. However, the time for such conversion varies with different equipment.

A telemetry (pulse code modulated) digital system, as a general rule, sends binary numbers that represent some parameter that is not the value of the binary number. The binary number must be scaled and converted to binary coded decimal to operate the readout device to display the desired result. As a general rule, "zero" volts is not binary number "0" but some small value. This is necessary to insure that the receiving equipment will stay in synchronization with the incoming signal. A long secession of all "0's" or all "1's" cannot be copied. Prior to the conversion operation taking place this offset of "0" bias must be removed from the signal.

In accordance with the present invention, it has been found that the difficulties encountered with converters heretofore, used may be overcome by providing a novel high-speed binary-to-binary coded decimal converter. This converter includes the following basic parts: (1) A plurality of decades of adders connected in cascade for converting units and successive multiples of 10, respectively, (2) each of said decades including a plurality of input terminals, a plurality of output terminals, and a carry output terminal, (3) the sum output terminals representing at least binary 1, 2, 4 and 8, respectively, (4) a corrector circuit including three adders connected in cascade having a plurality of inputs and outputs, (5) means for coupling the sum output terminals representing binaries 2, 4 and 8 to an input terminal of a respective adder of said corrector circuit, (6) a carry circuit coupled to the carry output terminal of each decade, (7) said carry circuit having a plurality of output terminals corresponding to multiples of tens coupled to the input terminals of a succeeding decade for transferring a carry signal to the next decade, and (8) means for coupling the output terminal of each of the carry circuits to predetermined inputs of the adders forming said corrector circuit for the preceding decade for supplying a predetermined corrector number thereto, so that a signal is produced on the output of the corrector circuit which reflects the binary coded decimal number converted by the respective decade.

Accordingly, it is an important object of the present invention to provide a converter that will convert a binary number to a binary coded decimal number without a clock and counterchain system.

Another important object of the present invention is to provide a converter wherein a binary number is converted directly into a binary coded decimal number.

Still another important object of the present invention is to provide a converter that can be expanded readily to handle numbers of any magnitude.

Still another important object of the present invention is to provide a binary-to-binary coded decimal converter which minimizes the use of machine time in supporting equipment as a result of directly converting a binary number into the binary coded decimal number.

Other objects and advantages of this invention will become more apparent from a reading of the following detailed description and appended claims, taken in conjunction with the accompanying drawings wherein:

FIG. 1 is a diagrammatic representation illustrating the manner in which prior art devices convert binary numbers to a binary decimal coded number.

Figure 4:
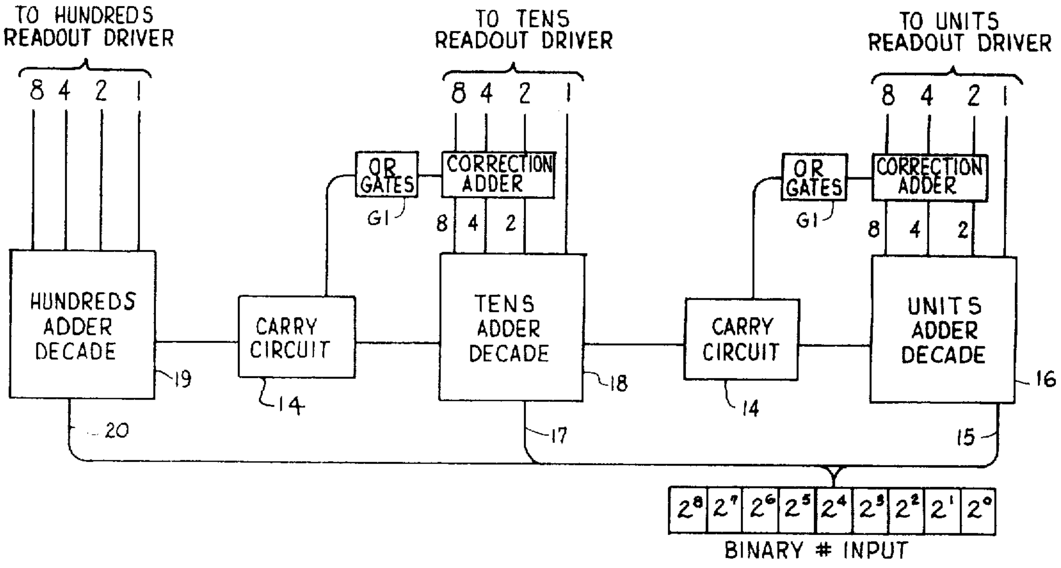
Figure 5:
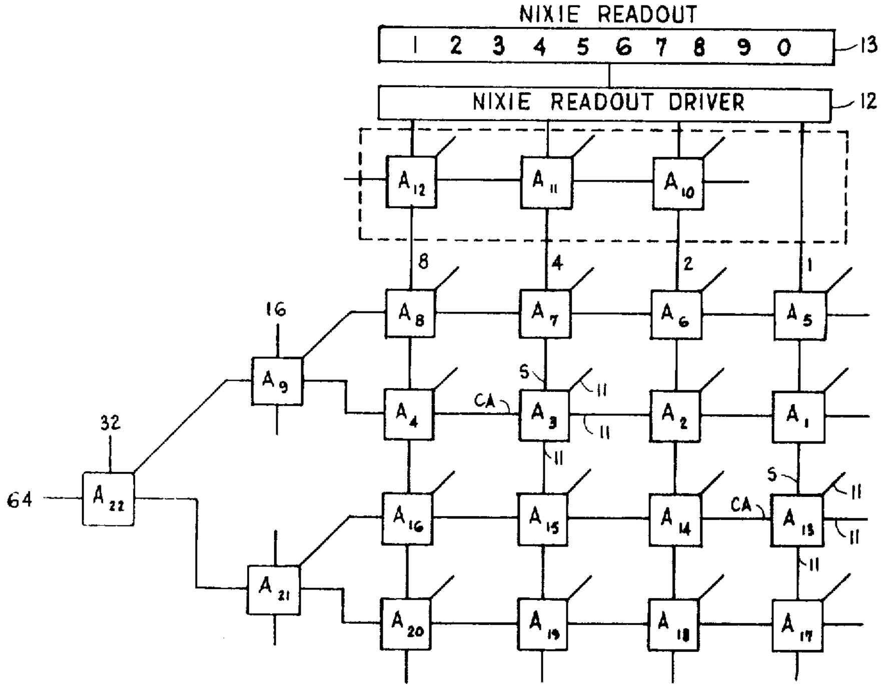
Figure 6:
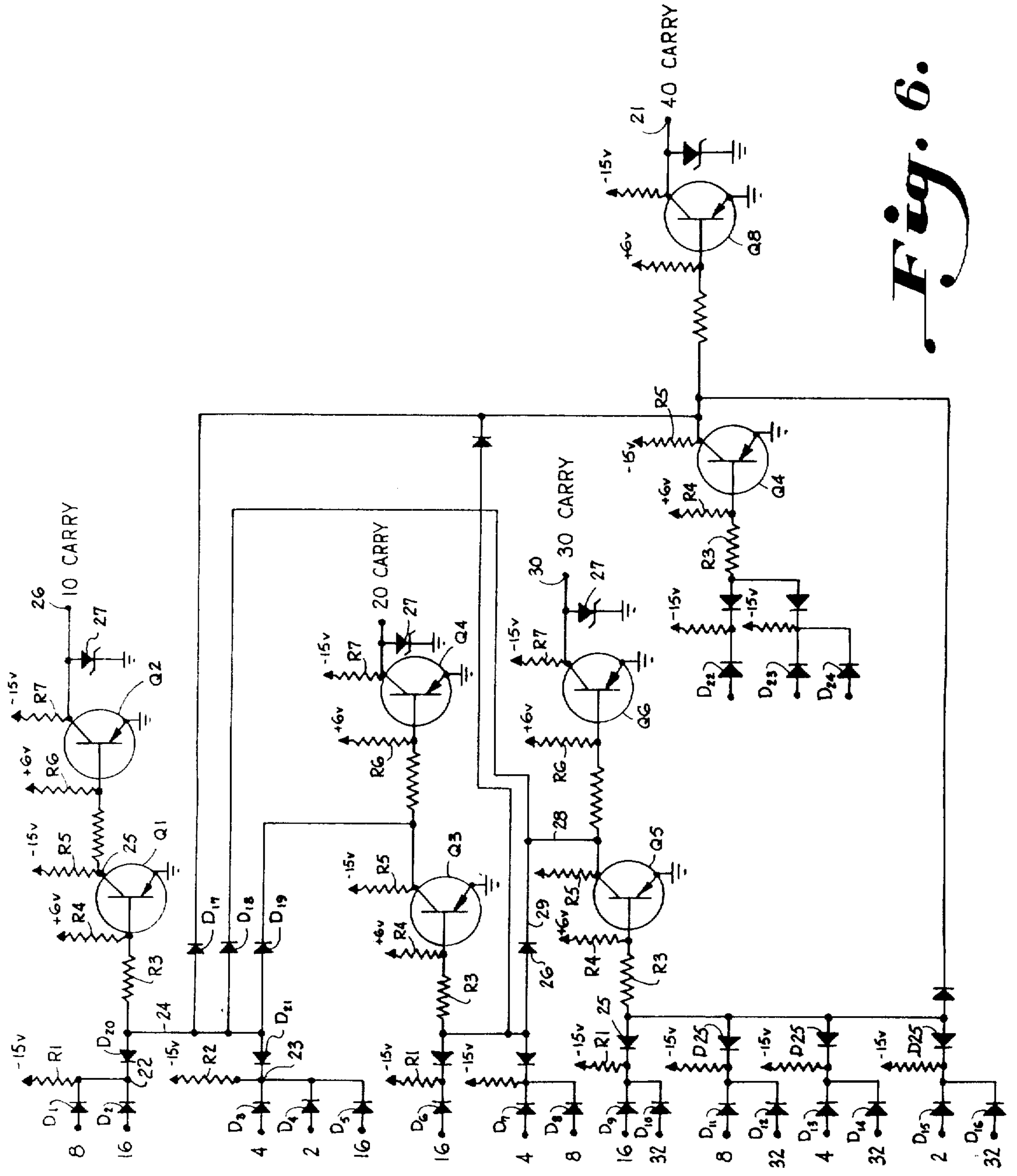

FIG. 2 is a schematic representation illustrating a portion of a single decade utilized in the binary-to-binary decimal code converter, FIG. 3 is a chart which is used in conjunction with FIG. 2 to illustrate the manner in which a binary number is converted, FIG. 4 is a schematic diagram, partially in block form, illustrating three stages of a binary-to-binary decimal converter constructed in accordance with the present invention, FIG. 5 illustrates the manner in which the decade of FIG. 2 can be expanded to accommodate more numbers, and FIG. 6 is a schematic diagram illustrating a carry circuit that is interposed between the decades of the converter.

Referring in more detail to the drawings, FIG. 1 illustrates the method heretofore used in converting binary numbers to binary coded decimal figures. The columns are each identified with a respective decimal number 1, 2, 4 or 8, which is fed into a nixie driver and subsequently into a nixie readout display tube for displaying the number in numerical form. The first four columns on the right are for units, while the four columns on the left are for tens. It is to be understood that such can be expanded to handle any size number, and only two decades are illustrated for the purpose of explaining the prior art system. For example, if it is desired to convert the binary number 11111 into the binary coded decimal number 31, first the binary number is shifted into the first two columns, as illustrated in row 2. After each shift the number within each decade is sampled to determine if the value of the number is 5 or greater. If the value of the number is 5 or greater, then 3 is added prior to the next shift. After the third bit of information is shifted into the decade illustrated in row 3 the value of the number within the decade is 7. Since such is greater than 5, 3 is added to the number, as illustrated in row 4, to make the number within the decade 101011, which is equal to the binary decimal coded number of 10. The next bit of information is then shifted into the register placing a new number with the least significant bit in the right hand column and the most significant bit in the first column of the 10's decade. It is again sampled and since the number in line 5 is 5 or greater, 3 is added again to the number to form the new number 110001, which is equal to 8 and is carried in line 6. The last bit of information is then shifted in as illustrated in row 7, and the operation is complete. The readout as evidenced from viewing row 7 is a 2 and 1 in the 10's decade which is equivalent to 30 and a 1 in the unit's decade which is equivalent to 1, making a total of 31 which is equivalent to the binary number 11111.

The above operation is accomplished by use of a clock and counterchain and the speed of the conversion is limited by the clock pulses, as well as the speed of operation of the counter and the maximum speed of the hardware associated therewith.

It is one of the purposes of the subject invention to eliminate the clock and counterchain so that the binary coded decimal number can be converted directly into a binary number minimizing the time for such conversion.

Referring to FIG. 2, there is illustrated a single decade of adders which will be explained so as to aid in understanding the operation of the complete binary-to-binary coded decimal circuit illustrated in FIG. 4. FIG. 2 illustrates a group of adders coupled together in the decade for producing the units readout. Similar decades are provided for the 10's readout and the 100's readout, etc. In order to obtain a unit readout a plurality of adders are coupled together, such as illustrated. Each of the adders has three inputs labeled 11, a sum output labeled S, and a carry output labeled CA. The four adders in the bottom row have their carry output connected to an input 11 of the next adder on the left. As can be seen, the carry output of adder A1 is connected to input 11 of adder A2. The sum output of adder A1 is connected to an input of adder A5 in the row directly thereabove. Similar connections are between adders A2 and A6, A3 and A7, and A4 and A8, respectively. The carry outputs of adders A4 and A8 are fed into inputs of adder A9. The sum outputs of adders A6, A7 and A8 are fed into a row of corrector adders A10, A11, and A12, which have their sum output connected to a nixie readout driver 12 which is, in turn, connected to a nixie readout or display tube for displaying the numerical character "0" through "9" which is equivalent to the least significant figure in the binary decimal coded number or total of numbers. It is also noted that the sum output of adder A5 is connected directly to the nixie readout driver 12 bypassing the correctors adders. The corrector adders form part of a corrector circuit 12a illustrated in broken lines.

Referring to FIG. 3, there is illustrated the binary number on the right, the binary decimal coded number in the middle, and a reference character A through H on the left which will represent the signal being fed into the adders. For example, if the binary coded number is 00000001, which is represented by the character A, such would be fed into the nixie readout tube and the numerical character 1 would be illuminated. If the binary character were 00010000 which is equivalent to 16, the character which is represented by E would be fed into adders A2 and A3, which is the units value 6, which is the least significant figure of the binary coded number 16. The 10 unit would have to be fed into the next decade, as will be more fully discussed in connection with FIG. 4. It is to be understood that FIG. 2 is provided to illuminate only the last digit in the binary decimal coded number. For example, if the number 128 was fed into the converter, the 8 character would be illuminated in the nixie readout tube 13 by the sum output of adder A4, since the 8 character is being fed in input terminal labeled H. Suppose the binary coded numbers 00000010 and 00000100 which represents the numerical numbers 2 and 4, respectively, were dumped simultaneously into the units adders. These two numbers are represented by the reference characters B and C, respectively. The adders are wired so B would apply an input to adder A6 and C would apply an input to adder A7. The sum produced on the outputs of adders A6 and A7 are fed directly through the adders A10 and A11 to the nixie readout driver 12 to illuminate the bulb 6 in the nixie readout 13. If, however, the numbers 2, 4 and 8 represented by the reference characters B, C and D were simultaneously dumped into the adder, then since such would total 14, it would only be desired to illuminate the unit lamp 4 in the nixie readout and send a "1" carry to the next 10's adder decade. This is accomplished in the following manner: The inputs B, C and D are applied to the adders A6, A7 and A8, respectively. They are fed to the corrector adders A10, A11 and A12, and are also sampled by the carry circuit 14. The carry circuit makes a decision as to the size of the number. It generates a carry "1" which is fed over to the "10's" adder decade, and also sends a corrector number which in this particular case is 6, back to corrector adders A10 and A11. This corrector number added to 14, which is already in the corrector adders A10, A11 and A12, will produce a residue number of 4 which will illuminate tube 4 on a nixie readout 13 and also send a carry number of "1" to the output of corrector adder A12 which is not used. The way this is accomplished is for example:

| | A12 | A11 | A10 | A5 | |
|---|---|---|---|---|---|
| | 0 | 1 | 1 | 0 | From carry circuit 14. |
| From 1 | 1 | 1 | 1 | 0 | From sums of A8, A7 and A6. |
| | 0 | 1 | 0 | 0 | |
| Carry | (1) | | | | |

As can be seen in the chart above, the information on one of the inputs of the adders A12, A11, A10 and A5 is 1110, respectively.

Since the binary number 0110, which comes from the carry circuit 14, is added to the numbers already in adders A12, A11, A10 and A5, the binary number 0100 is produced and the carry output is produced on the output terminal CA of adder A12. This carry output is disregarded. As can be seen, there will only be an output on the sum output terminal S of adder A11, which is fed to the nixie readout driver 12, and subsequently to the nixie readout 13 for illuminating the digit 4. The 10's digit will be illuminated by the 10's adder decade to produce the numerical number of 14. With the decade illustrated in FIG. 2 the maximum number is 35 and the maximum carry number from carry circuit 14 is 3. However, it is to be understood that it can be enlarged to handle any size number which is desired, such as illustrated in FIG. 5. The arrangement of adders illustrated in FIG. 5 can handle a numerical number up to 127. This is shown by adding the outputs of adders A22, A9, A8, A7, A6 and A5 which are 64, 32, 16, 8, 4, 2 and 1, respectively, which totals 127.

Referring now to FIG. 4, when it is desired to decode the binary decimal coded numbers $2^0$ through $2^8$ the numbers representing units, tens and hundreds are fed into the respective decade in binary form. For example, if the number being decoded were 256, then the number going in on cable 15 into unit adder decade 16 would be the binary number 6. Going in cable 17 to the 10's adder decade 18 would be the binary number 5, and going into the hundreds adder decade 19 over cable 20 would be the number 2. Therefore, on the sum output leads from the unit adder decade 16 there are signals representing the binary numbers 2 and 4 for illuminating the numerical number 6 in the nixie readout tube 13. There will be an output on the tens adder decade 18 on the 1 and 4 sum output leads to illuminate the nixie lamp 5 associated therewith, and there will be a 2 output from the hundreds adder decade 19 to illuminate the lamp 2 of the nixie readout associated therewith. Therefore, the lamps 2, 5 and 6 will be illuminated showing the conversion from the binary number 10000000 to the binary coded decimal number 256.

The corrector number from the carrier circuit 14 varies, depending on the size of the binary coded number and, as a result, the carry number. For example, referring to the chart below it can be seen that the corrector number for the binary number between 10 and 19 is 6, corrector number for the binary number between 20 and 29 is 12, the corrector number for the binary number between 30 and 39 is 2, etc.

| | |
|---|---|
| 10–19 | Corrector Number 6 |
| 20–29 | Corrector Number 12 |

| | |
|---|---|
| 30–39 | Corrector Number 2 |
| 40–49 | Corrector Number 8 |
| 50–59 | Corrector Number 14 |
| 60–69 | Corrector Number 4 |
| 70–79 | Corrector Number 10 |
| 80–89 | No correction required. |

The way this corrector number is determined is by sampling the sum outputs of the adders, for example, in FIG. 2 A6, A7, A8 and A9, to see how big the number is. When some multiple of 10 occurs on these outputs the sum outputs of adders A5, A6, A7 and A8 is subtracted in the carrier circuit 14 from the number 16 to give the corrector number to be fed back to the adders A10, A11 and A12. The value of the correcting or corrector number for any particular carry is the difference between 16 and the value of the bits 1, 2, 4 and 8 at the sample points when the carry (some multiple of 10) occurs. No correction to the "1" bit is required, therefore, the sum output of adder A5 is connected directly to the readout driver 12. Some other examples produced in computing the chart 2 above are as follows: For the number 50 which is made up of output 32, 16 and 2 the corrector number is 14 since the difference between 16 and 2 is 14; for 60 which is equal to 32, 16, 8 and 4 the corrector number is 4. When sampling the output leads 1, 2, 4 and 8 there is a signal on the output leads 4 and 8 which is equal to 12, and when this is subtracted from 16 this gives the corrector number 4. Looking at the number 80 such is made up by the binary outputs of 64 and 16. Since there are no outputs on the adders A5, A10, A11 and A12 which represents the outputs 1, 2, 4 and 8, there will be no corrector number for the decimal number 80.

Since the adder circuit is a conventional off-the-shelf item well known in the field, such will not be described. FIG. 6 only illustrates a carrier up through 40, and it is to be understood that such can be expanded to carry any number by arranging the proper inputs in the same scheme as illustrated for the numbers 10 through 40. The carry circuit illustrated in FIG. 6 is based on the logic of an active ground being a logic "1" and a minus 6 volts being a logic "0." From the base electrode of PNP-transistor Q1 to the collector electrode of PNP-transistor Q2 there is no logic conversion. It is also noted that the circuit associated with the 10 carry, 20 carry and 40 carry, each of which includes two transistors, are identical except that there is a lockout circuit associated with all of the carrier circuits above the 10 carry. Each one of the carry circuits locks out all of the carry circuits below it. In other words, if there is an output at terminal 21 of the 40 carry, there can be no output associated with the carry circuits below.

Referring to the 10 carry circuit, it can be seen that the output from adders A8 and A9 of FIG. 2 representing the binary numbers 8 and 16 are fed thereto. The corresponding inputs are sampled from adders A6, A7, A8 and A9 as illustrated by the binary number associated with the inputs in FIG. 6. Suppose there are outputs on adders A6 and A8 of FIG. 2 which represent the binary numbers 2 and 8 and total 10 therefore, requiring a "1" carry. The 8 decimal out of adder A8 is fed in through diode D1 to junction 22. Such will remove the minus 15 volts that is applied through resistor R1. The 2 binary is fed through diode D4 to junction 23 which removes the minus 15 volts which is applied through resistor R2 to junction 23. The cathodes of diodes D17, D18 and D19 are at "0" volts. Therefore, the lockout circuits in which they are interposed have no effect on the ten carry at the present time. Diodes D20 and D21 have their anodes connected together through lead 24 so as to produce an AND gate. The diodes D17, D18 and D19 also form part of the AND gate since their anodes are connected to lead 24. Since there is a "0" voltage on the anodes of all the diodes D20, D21, D17, D18 and D19, there will be a "0" voltage applied through the resistor R3 to the base of transistor Q1, and the plus 6 voltage applied through resistor R4 is allowed to cut transistor Q1 off. The voltage at junction 25 rises to a minus 15 volts since the collector is connected to such through resistor R5. This will, in turn, cause the base electrode of transistor Q2 to go negative overriding the plus 6 voltage applied through resistor R6, turning transistor Q2 on.

This, in turn, creates an active ground at the carry output terminal 26 which represents a 10 carry. It is noted that a minus 15 volts is connected through resistor R7 to the collector electrode of the transistor Q2. A zener diode 27 is also connected to the collector electrode of transistor Q2 for holding the collector electrode to approximately a minus 6 volts, which represents logic "9" whenever transistor Q2 is turned off. That requires a logic number that does not use or require a carry of 10.

Terminal 26 over which the 10 carry is fed is connected to the next adder decade, plus it also is connected back to the corrector adders A10 and A11 for feeding a corrector number 6 therein to correct the output being fed into the nixie readout driver to produce the right digit on the nixie readout 13. The outputs from the carry circuits are all fed back into the correction adders A10, A11 and A12 through OR-gates G1, since the adders are physically limited as to inputs.

In order to illustrate the manner in which a higher order carry circuit inhibits the carry circuit therebelow a number of 36 will be converted. The binary number 36 is made up of the numbers 32 and 4. It can be seen that the 4 is fed into the inputs associated with diodes D3, D7 and D13, while the 32 is fed into the inputs associated with diodes D10, D12, D14, D16 and D22. Since all of these diodes form part of an AND gate, the only AND gate that will be activated will be associated with the 30 carry since the AND gate associated with the 30 carry is made up of five OR gates which includes the diodes D9 and D10, diodes D11 and D12, diodes D13 and D14, and diodes D15 and D16, respectively. Since there is an input on each of these OR gates, the minus 15 volts coupled through resistors R1 is removed from the cathodes of diodes 25. When the minus voltage being applied to the cathode of diodes 25 is removed such, in turn, causes a plus 6 volts at the base of transistor Q5 and the operation of the carrier circuit associated with the 30 carry is identical to that described in conjunction with the 10 carry above, except the minus 15 volts developed on the collector of transistor Q5 is fed back over lead 28 through diode 26 to disable transistor Q3 from generating a carry in the 20 circuit and also through lead 29 to diode D18 for disabling the 10 carry. It is seen that the 10 carry circuit is coupled through diodes D17, D18 and D19 to a higher order carry circuit similar to that described in connection with the 30 carry so that whenever any of the higher order carry circuits are enabled such disables the 10 carry. The same would be true for the 20 carry. In other words, the higher carry has the priority. The output of the 30 carry is applied to terminal 30 and such is fed to the next adder decade, as well as back through an OR gate to an input of A10 of FIG. 2 for causing the correct unit digit to be reproduced on the nixie readout 13.

While a preferred embodiment of the invention has been described using specific terms, such description is for illustrative purposes only, and it is to be understood that changes and variations may be made without departing from the spirit or scope of the following claims.

What is claimed is:

1. A binary-to-binary coded decimal converter comprising:

A. a plurality of decades of adders, one of said decades provided for converting binary numbers into binary coded decimal numbers corresponding to units, said other decades provided for converting numbers which are multiples of tens, B. said decades being connected in cascade for producing output signals in order of progressively higher multiples of 10, C. each of said decades having a plurality of sum output terminals for each of the numbers 1, 2, 4 and 8 and a carry output terminal, D. a corrector adder coupled to said sum output terminals of each of said decades, said corrector adder including three stages connected in cascade, each of said three stages including an adder having a plurality of input terminals, a sum output terminal, and a carry output terminal, E. means for connecting the sum output terminals for the numbers 2, 4 and 8 to an input terminal of a respective adder in said corrector adder, F. carry circuits interposed between successive pairs of said decades for receiving a carry signal from the next preceding decade and supplying said carry signal to the next succeeding decade, and G. means for coupling each of said carry circuits back to said corrector adder which is coupled to said sum output terminals of the next preceding decade for supplying a corrector number to said corrector adder for modifying the sum output being received from said preceding decade by said corrector adders for properly reflecting the binary coded decimal number.

2. The binary-to-binary coded decimal converter as set forth in claim 1 wherein:

A. each of said carry circuits has carry terminals for carry numbers which are the multiples of 10 extending from 10 to 90, and B. means for coupling said carry output terminals to input terminals of certain predetermined adders in the corrector adder associated with the preceding decade.

3. The binary-to-binary coded decimal converter as set forth in claim 2 wherein:

A. a readout device coupled to the outputs of each of said connector circuits for displaying the number converted in numerical form.

4. A binary-to-binary coded decimal converter comprising:

A. a plurality of decades of adders connected in cascade, said cascade of decades provided for converting units and successive multiples of ten respectively, B. each of said decades including a plurality of input terminals, a plurality of sum output terminals and a carry output terminal, C. said sum output terminals representing at least binaries 1, 2, 4 and 8, respectively, D. a corrector circuit including three adders connected in cascade having a plurality of inputs and outputs, E. means for coupling said sum output terminals representing binaries 2, 4 and 8 to an input terminal of a respective adder of said corrector circuit, F. a carry circuit coupled to the carry output terminal of each decade, G. said carry circuit having a plurality of output terminals corresponding to multiples of tens, coupled to said input terminals of a succeeding decade for transferring a carry signal to the next decade, and H. means for coupling said output terminals of each of said carry circuits to predetermined inputs of said adders forming said corrector circuit for the preceding decade for supplying a predetermined corrector number thereto for modifying the sum of the signals fed to said input terminals of said decades when said sum is greater than ten so that a signal is produced on the output of said corrector circuit which reflects the binary coded decimal number converted by the respective decade.

5. The binary-to-binary coded decimal converter as set forth in claim 4 wherein:

A. said output terminals of each of said carry circuits are connected to an input of the same adders of a respective corrector circuit as the sum output terminals representing binaries 2, 4 and 8.

6. The binary-to-binary coded decimal converter as set forth in claim 5 further comprising:

A. a readout device provided for displaying signals in numerical form, and

B. a readout driver coupled to the outputs of each of said corrector circuits and said readout device for receiving signals from a corrector circuit and causing said readout device to display said signal in numerical form.

7. The binary-to-binary coded decimal converter as set forth in claim 6 wherein, said readout is a nixie readout tube.

8. The binary-to-binary coded decimal converter as set forth in claim 5 wherein:

A. said means for coupling said output terminals of each of said carry circuits to said predetermined inputs of said adders forming said corrector for the preceding decade supplies a corrector number equal to 6 when there is a 10 carry, a corrector number of 12 when there is a 20 carry, a corrector number of 2 when there is a 30 carry, a corrector number of 8 when there is a 40 carry, a corrector number of 14 when there is a 50 carry, a corrector number 4 when there is a 60 carry, and a corrector number of 10 when there is a 70 carry.

* * * * *